Figure 1:
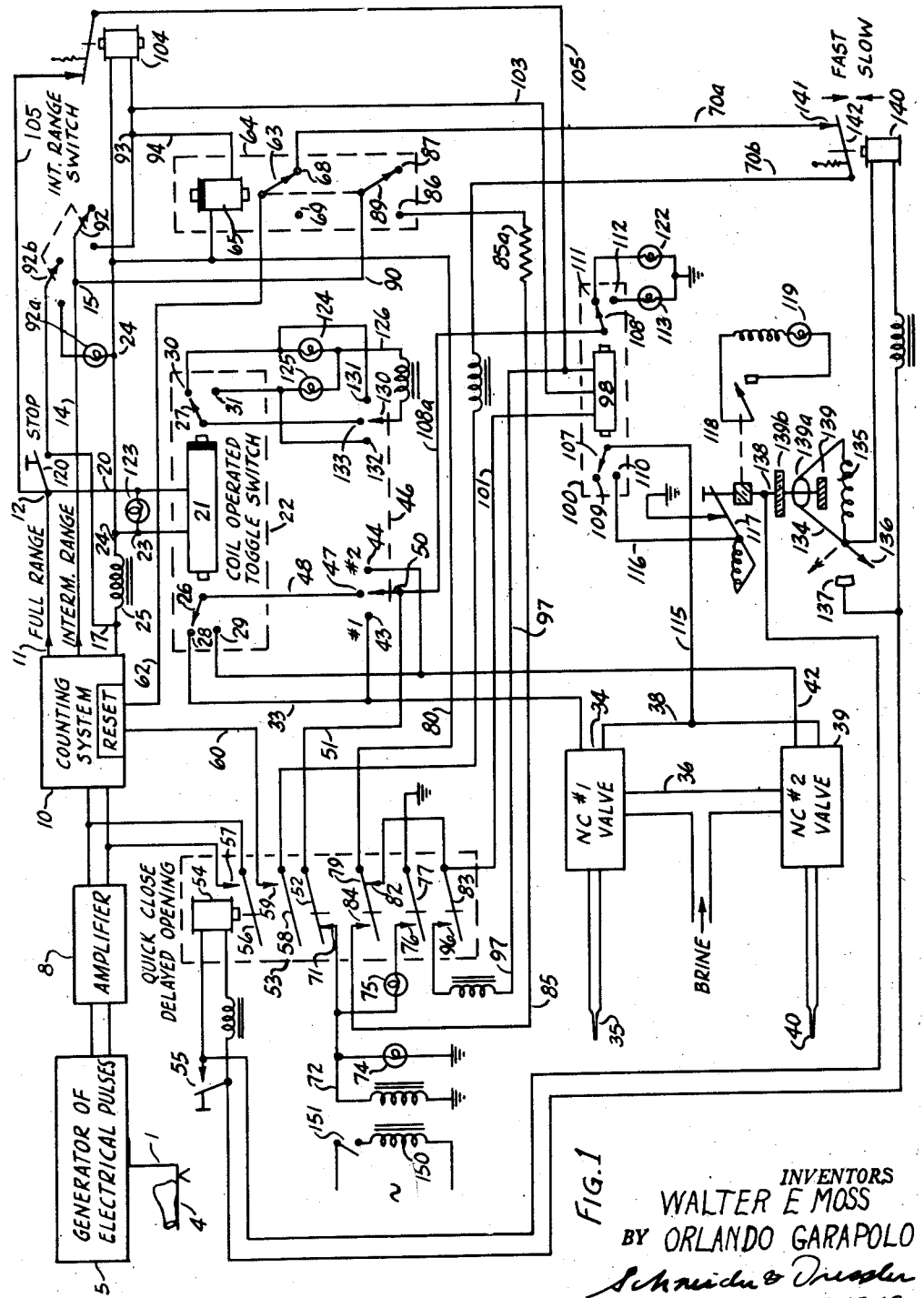
Figure 4:
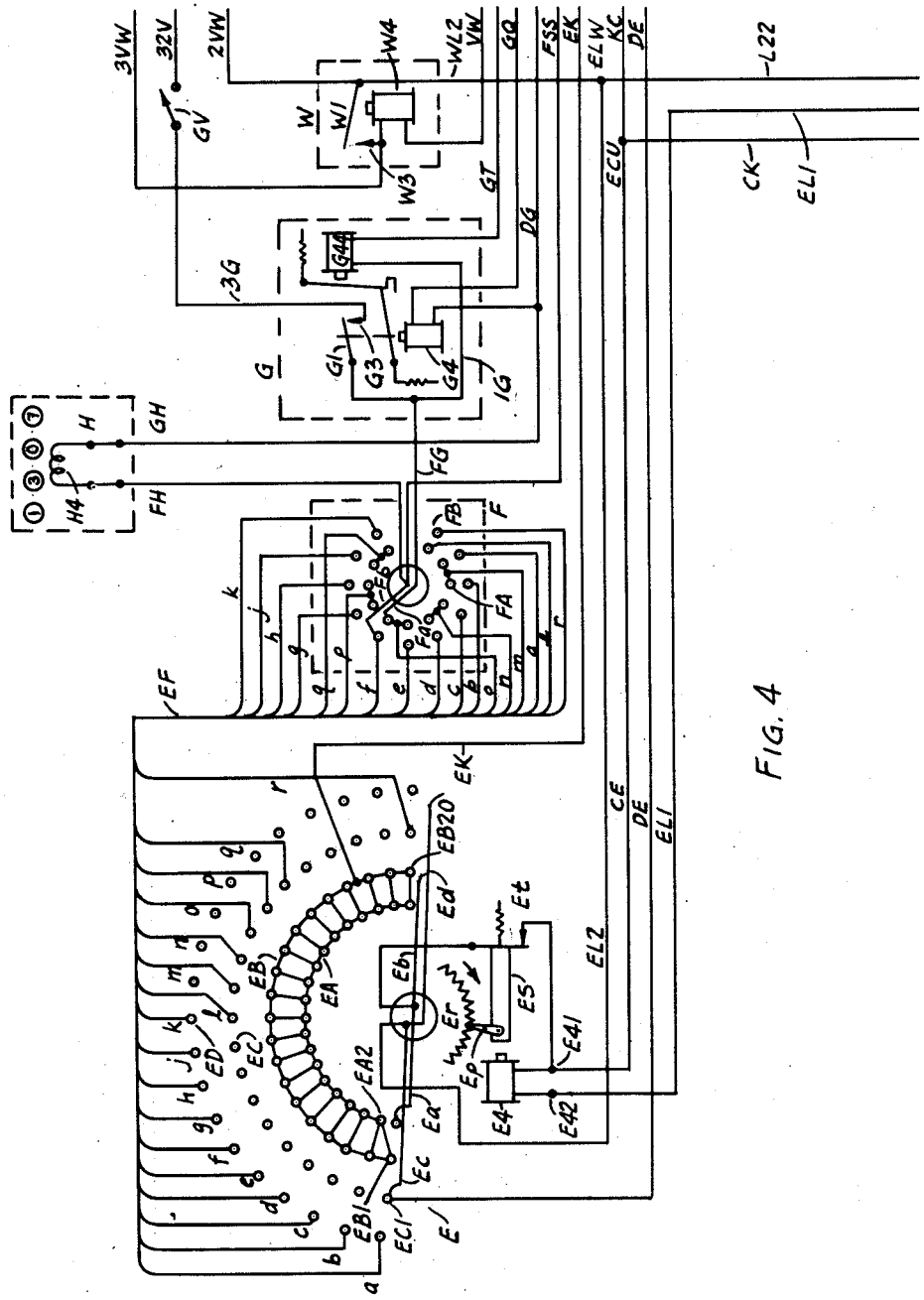
Figure 5:
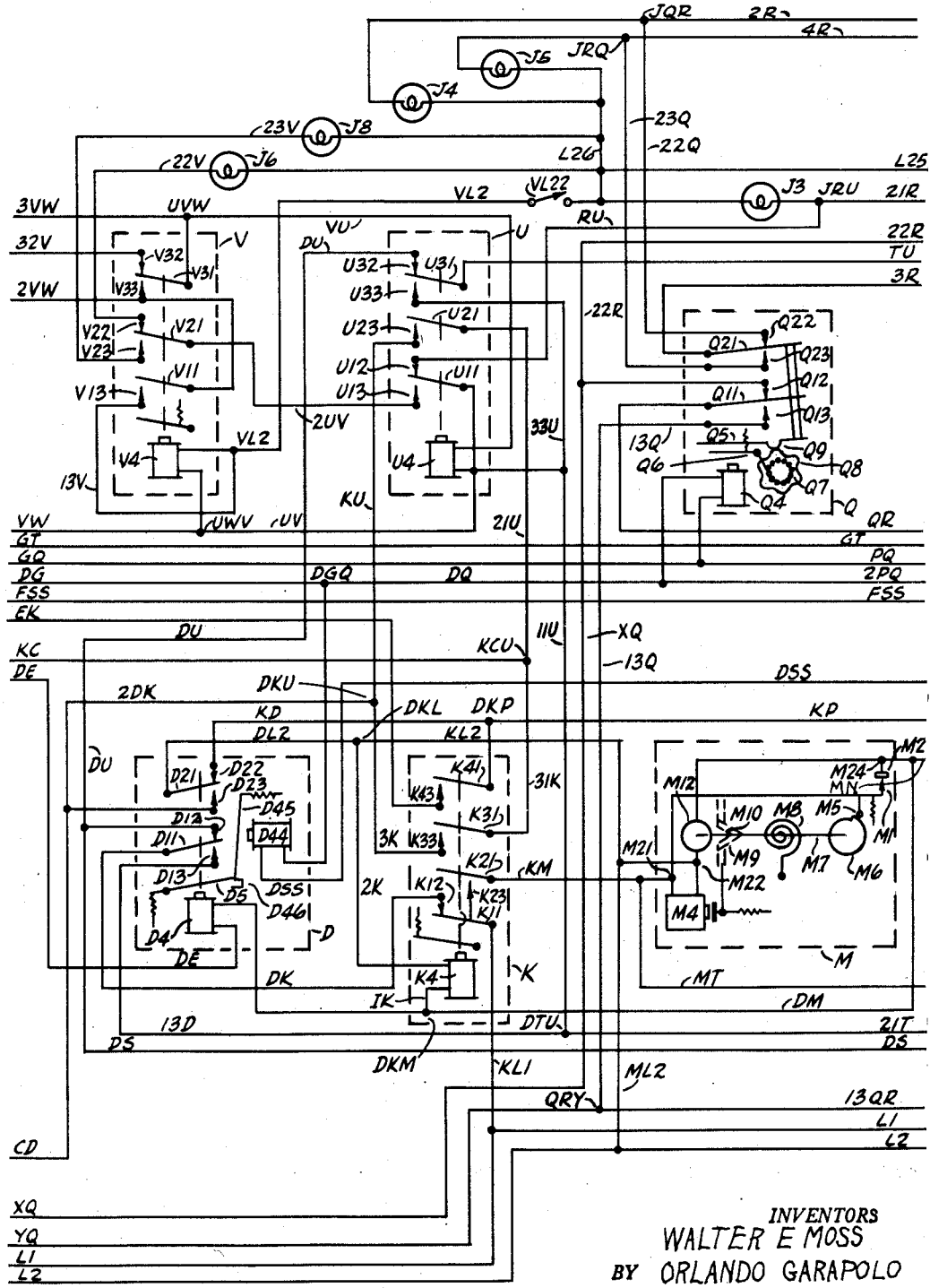
Figure 6:
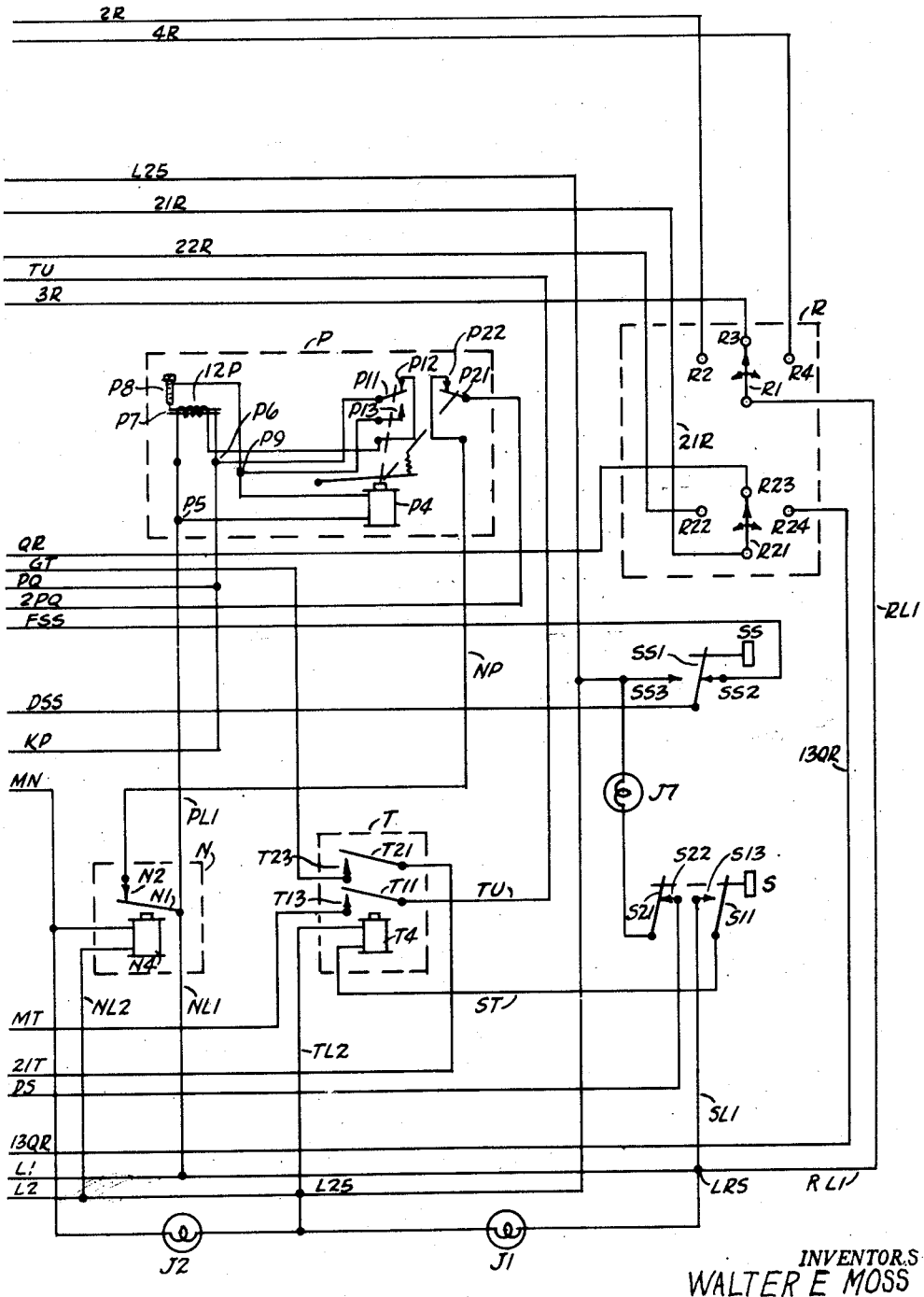

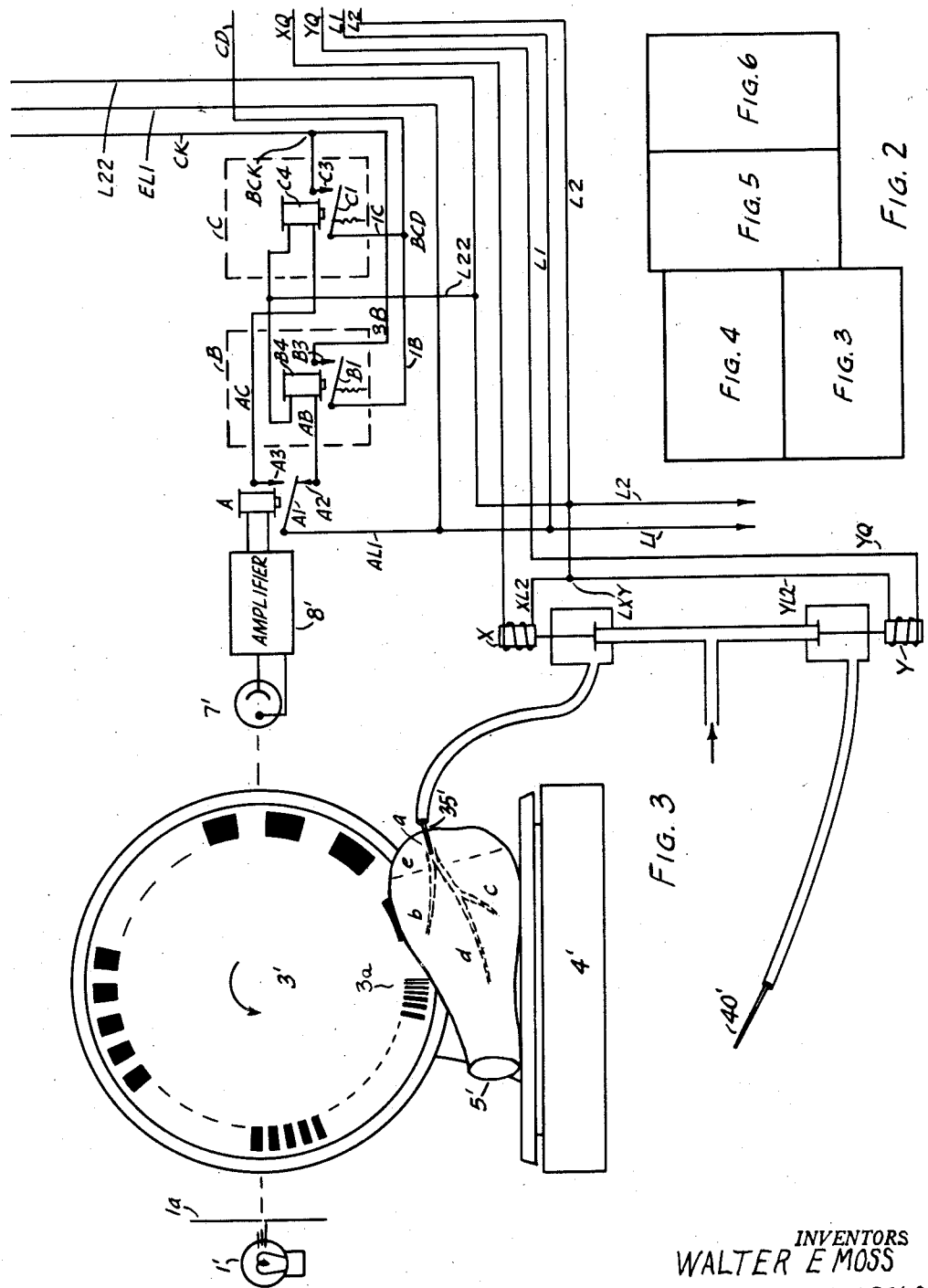

INVENTORS
WALTER E MOSS
BY ORLANDO GARAPOLO
ATTORNEYS

Patented Aug. 5, 1952

2,605,694

UNITED STATES PATENT OFFICE 2,605,694

WEIGHING SYSTEM

Walter E. Moss, Brookfield, and Orlando Garapolo, Chicago, Ill., assignors to Wilson & Co., Inc., a corporation of Delaware Application March 11, 1950, Serial No. 149,078

14 Claims. (Cl. 99—256)

This invention relates to a weighing system and is an improvement upon the system disclosed and claimed in the copending application of Lyman L. Campbell, Serial No. 17,520, filed March 27, 1948. In the application referred to above there is disclosed a weighing system for adding or subtracting a predetermined fraction of any base weight falling within the operating range of the system.

In many industrial operations, it is important to first determine the base weight of some material and then process said material to a point where the base weight is either increased or decreased by a fixed proportion of such base weight. The material specifically considered in the Campbell case and in this application is a ham and the processing of the ham involves pumping brine up to a fixed percentage of the base weight of the ham. It will be understood, however, that other materials than ham may be treated and that instead of adding weight during processing, it is possible to subtract a certain proportion of the base weight during processing. For convenience, however, both the general and specific description will be made in connection with the supply of brine to raw hams.

In the Campbell case referred to above, a scale determines the base weight of the ham prior to any processing. After the scale has reached a condition of equilibrium, brine is pumped into the ham. As the weight of the ham increases with the introduction of brine, the scale responds in the usual manner.

As disclosed in said application, the constant ratio of weight increment to base weight involves a logarithmic relationship as a design factor in the system. Thus in the Campbell application, a scale member having an approximately linear movement with variation of weight is coupled to a pulsing control member through a mechanical coupling whose ratio varies substantially according to the equation of a logarithmic spiral. Hence no matter what the base weight is, an increment of weight can be added whose proportion to the base weight remains constant.

While the system disclosed and claimed in the Campbell application is satisfactory, it has been found that the full abilities of an operator are not used to advantage. After the ham has been prepared for the introduction of brine, the system for pumping the ham is fully automatic and does not require any further attention from an operator until the process is complete. Thus an operator must wait on the machine.

We have improved upon the system disclosed in the Campbell application and provided a system which is more flexible and adaptable to various operating conditions. In general our improved system has a pair of brine needles and control valves with means for alternatively or selectively rendering the needles operative for processing purposes. Thus a system embodying our invention may be conditioned so that while one needle is in use, supplying brine to a ham, the other needle is idle and inoperative for pumping and may be positioned by the operator in another ham in readiness for processing. At the completion of a processing cycle, the one needle is rendered inoperative and the other needle may now be used for supplying brine. Thus alternate needles are rendered operative. It is also possible to condition the system so that either one or the other needle alone is effective for processing. We have also improved upon and simplified the means whereby the logarithmic relationship is secured between the movement of the weighing device and that of the pulsing control means.

As is well known, many hams are so cut as to have not only the deep femoral and anterior femoral arteries but also a portion of the femoral or external iliac artery going to the junction of the first two named arteries. With such hams, the process of pumping brine into the ham merely requires the insertion of the brine supply needle into the femoral or external iliac artery. The brine divides and flows into the two arteries and normal processing may occur. Frequently, however, a ham is so cut that the femoral or external iliac artery is not present. In such a ham, it is necessary to divide the pumping into two steps, part of the brine being pumped into the deep femoral artery while the remainder of the brine is pumped into the anterior femoral artery. In order to accommodate such hams, our invention makes it possible to divide a brine pumping cycle into two or more parts without affecting the alternate energization of needles or in any way having any substantial effect upon the normal operation of the system.

Our invention also provides means for interrupting the pumping process at any time and resuming pumping or for stopping the brine pumping and returning the system to its initial condition when a leaking ham is encountered. Such leakers cannot retain brine and must generally be processed by hand in a manner well known in the art.

In carrying out our invention we, in general, provide for two brine needles, each connected to an individual valve. Each valve has suitable electro-magnetic control means with both valves interlocked so that only one valve may be opened or may be active at any time. Suitable relay means are provided whereby the brine valves are alternately rendered active to supply brine to a needle during a processing cycle.

Any suitable scale means for weighing the ham may be used providing, of course, that such scale means can operate over the desired range of weights.

In carrying out our invention we are enabled to use a scale means of the customary character having a part, generally a disk or a cylinder, movable over a range in substantially linear relation to the weight upon the scale. Associated with such a member is a pulsing control member forming part of a pulse generating system. As with the Campbell system, the pulse generating system involves a logarithmic relationship as a design factor therein. Thus one example of a pulse control means having the desired design factor therein is a light source and photo-electric cell with an intervening disk having alternate transparent and opaque portions. The angular position of the disk has a substantially linear relationship to the weight on the scale platform. The transparent and opaque portions may be disposed in an annular band with the angular widths of the successive light and dark portions having the desired relative logarithmic relationship.

Another example of a pulsing control is a commutator having alternate conducting and non-conducting portions cooperating with a brush, all the conducting elements being grounded to a common terminal. The relative angular extents of the conducting and non-conducting strips will be in logarithmic proportion. The one brush will naturally be narrower than the narrowest strip of either conducting or non-conducting material. This commutator will be turned through angles having a linear relationship to the weight on the scale platform.

Still another example is a disk similar to the light control disk but acting to control a blast of air. Thus such a disk may have solid and cut out portions along an annular region, the angular width of such portions being related to each other logarithmically, as explained above. An air controlled switch may be opened or closed by the air blast.

In all the pulse generating systems, the pulse is electrical in nature. The number of pulses is a measure of the change of weight of the article being processed, each pulse corresponding to one proportional increment of weight added to (or subtracted from) the base weight. When no change in weight occurs, no pulses are generated.

In operation, after the scale has come to an equilibrium with a fresh ham on the scale platform and the needle inserted, the system provides for brine to be supplied to the ham. As the weight of the ham increases, the scale responds and electric pulses are generated. Through a system of relays and stepping switches (or electronic counting systems) means are provided for determining an operating cycle and thereafter rendering the supply of brine to the active needle inoperative. A complete operating cycle involves the generation of a predetermined constant number of electrical pulses, as more fully disclosed in the Campbell application.

In order that the invention may be understood, it will now be explained in connection with the drawings wherein Figure 1 shows a block diagram of a system embodying the present invention.

Figure 2 is a diagram of the arrangements of Figures 3 to 6 inclusive and Figures 3 to 6 inclusive show a detailed system embodying the present invention.

Referring first to Figure 1, member 1 is connected in a suitable manner to a scale to be moved linearly with the weight upon scale platform 4. This member may form part of a pulse generating system 5 whose output consists of electrical pulses. The number of pulses is a function of the incremental variation of weight and, as previously pointed out, the weight increment is a substantially constant proportion of the base weight from which the incremental value is derived. Such a pulse generator may assume a variety of forms as previously indicated.

The output of pulse generator 5 is fed to amplifier 8 which may be of the vacuum tube type or may include one or more relays. The amplified pulses are fed to an electrical or electronic counter 10 having the characteristic of counting up to any desired number and then closing one or more circuits. Inasmuch as a predetermined number of weight increments will correspond to a predetermined percentage weight variation, it follows that a predetermined number of pulses will be generated during such weight variation. Hence whether the base weight is 8 pounds or 15 pounds or any other weight within the range of the system, a constant percentage weight increase, say 10%, will result in a constant number of pulses.

Counter 10 may, for example, be a stepping switch such as is used in automatic telephony and numerous other fields or may be of the electronic type having a number of vacuum or gas tubes connected together so that successive pulses trigger successive tubes. Such counters may be connected ringwise and may be used for high speed counting up to any desired value. An example of an electronic counter which may be used is disclosed in Patent 2,310,105 issued February 2, 1943. If a stepping switch is used, it may for example be similar to the one used in the detailed system hereinafter described, this being type SD*70 manufactured by Clare & Co. Counter 10 has suitable means for resetting to zero, this being well known in the art.

The electrical counter has full range output circuit including wire 11 going to junction 12 and has an intermediate range output circuit including wire 14 going to junction 15. It is understood that by the full range output circuit is meant a relay circuit which is closed (or opened) when the counter reaches the desired number corresponding to a full weight variation. By intermediate range output circuit is meant a relay circuit which is closed (or opened) when the counter reaches a desired intermediate number corresponding to a desired intermediate weight variation.

The counter output circuit includes common return 17. Means may be provided for varying the number to be counted either for the intermediate or full range or both and it is possible to provide for a plurality of intermediate ranges.

Junction 12 is connected by wire 20 to winding 21 of slow acting relay 22. Relay 22 is of the type having an energizing winding with means for moving one or more movable contacts, first in one direction for an energizing cycle and then in the other direction for a succeeding energizing cycle and in effect provides for a power-operated toggle switch. Thus as an example, the series S–120 ratchet relays manufactured by Guardian Manufacturing Co. has a relay of this type. Winding 21 of relay 22 has its other terminal connected by lead 23 to wire 24. Between wire 24 and common return 17 of counter 10 is any source of current, diagrammatically illustrated by a transformer winding 25. Relay 22 has movable contacts 26 and 27 which are moved from one position to another for each relay winding energizing cycle. Movable contact 26 cooperates with fixed contacts 28 and 29 while movable contact 27 cooperates with fixed contacts 30 and 31.

Contact 28 is connected by wire 33 to one terminal of the operating winding of electrically actuated valve 34. As is indicated, this valve is normally closed and may be considered as the No. 1 valve supplying needle 35. Valve 34 has an inlet connected to brine line 36. Valve 34 has its other terminal connected to common wire 38 going to the winding of valve 39 which is similar to valve 34 and controls the supply of brine to needle 40. Valve 39 has a connection by wire 42 to contact 29 of the relay 22. In practice each needle has a clamp associated with it and a shield so that the brine pressure will not force the needle out or waste brine. This is well known in the art and is not shown.

Wires 33 and 42 are connected respectively to contacts 43 and 44 of manual selector switch 46. The purpose of this selector switch is to determine whether the system will operate automatically and select first one valve and then another for use or whether each valve is to be used as desired. Contact 47 of the selector switch is connected by wire 48 to movable contact 26 of relay 22. Movable contact 50 of the selector switch is connected by wire 51 to movable contact 52 of delay relay 53. Relay 53 has winding 54 and is provided with a number of movable contacts. This relay is of the type which closes quickly but opens after a predetermined delay. As a rule, the delay in the present system may be of the order of about four or five seconds for the purpose of delaying the brine pumping portion of the cycle until the ham on the scale has been weighted and the scale is at equilibrium. Such relays are well known in the art and are provided with various means for controlling the amount of delay. Thus the delay may be provided by a synchronous timing motor, bi-metallic strip with heating element, dash pot or any other suitable means.

Winding 54 is connected by wire through a suitable source of current to start switch 55. Movable contact 56 of relay 53 cooperates with off-normal contact 57 and these two contacts are bridged across the output of amplifier 8. This can disable the counting system. Movable contact 58 of relay 53 cooperates with off-normal contact 59. Contact 59 is connected by wire 60 to the reset portion of counter 10. It is understood that this reset portion of the counter may either be a reset which returns the counter back to a starting position or which advances the counter until a predetermined starting position is reached. The other reset terminal is connected by wire 62 to movable contact 63 of relay 64 similar to relay 22. Contact 63 of relay 64 cooperates with contacts 68 and 69, the latter being dead. Contact 68 is connected by wire 70a, relay contacts to be later described and wire 70b and a suitable source of energy, as a transformer winding, back to movable contact 58 of delay relay 53.

Movable contact 52 of delay relay 53 cooperates with normal contact 71 which is connected by wire 72 to a suitable source of current to ground. Wire 72 is also connected to ground through lamp 74. Wire 72 is connected through lamp 75 to off-normal contact 76 cooperating with grounded movable contact 77 of delay relay 53. Delay relay 53 has movable contact 79 connected by wire 80 back to one terminal of winding 65 of relay 64 and also connected to wire 24. Movable contact 79 cooperates with normal contact 82 connected to movable contact 83 of relay 53. Movable contact 79 also cooperates with off-normal contact 84 connected by wire 85 and current limiting resistor 85a to contact 86 of relay 64. Contacts 86 and 87 cooperate with movable contact 89 of relay 64. Movable contacts 63 and 89 are tied together. Thus in the position shown, movable contact 63 is on live contact 68 while movable contact 89 is on dead contact 87. Movable contact 89 is connected by wire 90 to junction 15. From junction 15 a connection is made to the movable contact of switch 92 for controlling the intermediate range action. Switch 92 has a fixed contact which is connected to junction 93 from which point wire 94 goes to the other terminal of relay winding 65.

Movable contact 83 of delay relay 53 cooperates with off-normal contact 96 connected through a suitable source of power to wire 97 going to winding 98 of relay 100. This relay is similar to relays 22 and 64. Relay winding 98 has common return 101 going to movable contact 83 and normal contact 82. Winding 98 has tap 103 going to junction 93. Connected to junction 93 and wire 24 is relay 104, whose normally closed contacts close a break in wire 105 from 12, the high side of winding 98 (this being the side having wire 97 connected thereto.)

Winding 98 of relay 100 controls movable contacts 107 and 108. Contact 107 cooperates with dead contact 109 and live contact 110, while contact 108 cooperates with contacts 111 and 112. Movable contact 108 is connected by wire 108a to movable contact 50 of selector switch 46 and contact 112 is connected to grounded lamp 113. This lamp, when lit, indicates that pumping is taking place.

Movable contact 107 of relay 100 is connected by wire 115 to the common valve wire 38. Fixed contact 110 of this relay is connected by wire 116 through part 117 of an interrupt toggle switch. This interrupt switch is grounded. Part 118 of the interrupt switch is connected to control lamp 119. When the interrupt switch is operated the lamp is lit, indicating that the system is interrupted.

Lamp 122 is connected between ground and contact 111 of relay 100. Contacts 30 and 31 of relay 22 are connected to pump indicator lamps 124 and 125 respectively, these lamps having common wire 126 going to a source of power and connected to movable contact 130 of a second section of selector switch 46. Fixed contacts 131 and 132 are connected respectively to contacts 30 and 31 while contact 133 is connected to movable contact 27.

Interrupt switch 117 is also mechanically tied to switch 134 consisting of toggle 135 having movable contact 136 cooperating with fixed contact 137. Contact 137 is small enough so that movable contact 136 engages contact 137 for only part of its travel. Toggle 135 is actuated through lost motion means 138 having contact 139 cooperating with toggle contact 139a in one direction of toggle movement only. In the reverse direction, insulating block 139b drives the toggle without completing the circuit. Thus toggle switch 134 is momentarily closed in one direction only of actuation. The direction of closure for toggle switch 134 coincides with the direction of movement of switch 117 for closing. Switch 134 is connected across start switch 55.

Contacts 136 and 137 also control a circuit with relay 140 therein. Relay 140 has contacts 141 and 142 normally closed in circuit with wires 70a and 70b. This relay attracts its armature quickly and releases a short time after delay relay 53 releases. The purpose of this is to prevent resetting of counter 10 when resuming operation after interruption and during the delay period.

Stop switch 120 is connected between junction 12 and common return 17 of counter 10 and is provided for the purpose of stopping pumping and terminating the cycle.

Transformer primary 150 is connected through on-off switch 151 to a power line and is adapted to energize the various transformer windings.

The operation of the system shown in Figure 1 is as follows: When switch 151 is closed, the main power line is connected to primary 150 for supplying power to the various portions of the system. Lamp 74 will go on. Normally the system will be in the position shown, and assuming that the manual selector switches are in the automatic position as shown, a ham may be put on scale platform 4. Needle 35 from valve No. 1, which is the one to be operated, has been inserted into the ham in preparation for pumping. Start switch 55 is closed. When this switch is closed, the winding of relay 53 is energized and pulls up the movable contacts of this relay. These contacts are in the off-normal position for the delay period and this period is long enough so that the scale will come to equilibrium. During the delay period, amplifier 8 is short-circuited by movable contact 56 closing against contact 57. At the same time, a counter reset circuit will be established running from fixed contact 59 along wire 60 through the reset portion of counter 10, wire 62, movable contact 63, fixed contact 68, wire 70a, normally closed contacts 141 and 142 of relay 140, wire 70b, movable contact 58 and fixed contact 59. Thus counter 10 will quickly assume a starting position in preparation for an operating cycle.

At the same time, contact 77 will close against contact 76 and light lamp 75 to indicate that a delay period is on. Movable contact 83 will close against fixed contact 96 to condition pump control relay 100. This circuit may be traced from movable contact 83, fixed contact 96, through a suitable source of potential to wire 97, through winding 98 back along wire 101 to movable contact 83. Relay 98 is arranged so that either portion of the winding, when energized, will actuate relay 100 and hence the relay will move contacts 107 and 108 from the positions shown to a pumping position. Considering movable contacts 107 and 108, the circuits for energizing valve No. 1 or No. 2, whichever is to be used, and pumping lamp 113 are still incomplete during the delay period because of the energization of relay 53.

Assuming now that the delay period has expired and relay 53 opens, the short-circuit for amplifier 8 will be broken. At the same time, a circuit will be established for opening the brine supply valve. Thus, beginning with movable contact 52 of relay 53 the circuit may be traced along wire 51 to movable contact 50 of the selector switch, fixed contact 47, wire 48, movable contact 26, fixed contact 28, wire 33 through No. 1 valve, common return 38, wire 115, movable contact 107, fixed contact 110, wire 116, through switch 117 to ground, from ground through the transformer winding to wire 72 and fixed contact 71. Thus brine will begin to flow and the scale 4 will move. As the ham weight increases, pulses will be generated and cause counter 10 to operate. Assuming that full range is desired, when counter 10 has reached a predetermined point corresponding to a predetermined proportional addition of weight in ham 5, a circuit within counter 10 will be established from wire 17 to wire 11 and energize winding 21 of the slow acting relay 22. This will cause movable contact 26 to change from one fixed contact to the other and prepare valve No. 2 for the next operation. At the same time, a brine cut-off circuit is established from junction 12 along wire 105 through relay winding 98, common return 101, fixed contact 82 of delay relay 53, movable contact 79, wire 80 to wire 24. This will operate fast acting relay 100 and return contacts 107 and 108 to the position shown where the valves are closed.

In case it is desired to stop, switch 120 may be closed which gives the same effect as though the counter had reached its full range. Lamp 122 will light, this circuit going from ground through lamp 122, contacts 111 and 108, wire 108a, wire 51, contacts 52 and 71 to ground. In case the system is to be interrupted, switch 117 may be opened, this breaking the circuit through either valve and causing the valve to close. Lamp 119 will be lit when switch 118 is closed. The closure of switch 117 will operate switch 134 and initiate operation of the entire system through delay relay 53. At the same time that delay relay 53 is operated, relay 140 will be energized and will quickly open the reset circuit at wires 70a and 70b. Relay 140 will keep the contacts open at least for the duration of the delay period so that no resetting can occur. After the delay period has passed, relay 140 will release and the reset circuit will return to normal.

The ham specifically shown in Figure 3 has the principal arteries diagrammatically outlined. Thus as a rule, the femoral or external iliac artery a provides a convenient place for insertion of a brine pumping needle. Brine is forced through deep femoral branch b into one part of the ham and through the anterior femoral artery c and the popliteal artery d into the other part. Occasionally a ham is so cut as to eliminate the external iliac part of its arterial system. In such case, successive pumping of the two parts of the ham is necessary. It is understood that an even division of brine between the two parts of a ham or any other desired division therebetween may be selected with the full range in counter 10 being broken up by wire 14 going from a different tap on the counter.

If intermediate range action is desired, switch 92 is closed at any time prior to counter 10 reaching the first intermediate point. The starting action is the same and when counter 10 reaches the intermediate point, winding 65 of relay 64 is energized. This circuit may be traced from wire 14 through junction 15, switch 92, junction 93, wire 94, winding 65, wire 24, back to common return 17 and into the counter. When relay 64 is energized, movable contacts 63 and 89 are moved from the position shown in Figure 1 to the alternate position. When movable contact 63 is on dead contact 69, the reset circuit is open, even though delay relay 53 may be closed. Thus, when pumping is resumed by closing the starter switch 55, no reset of counter 10 will occur during the delay period. When movable contact 89 closes against live contact 86, a short-circuit through relay winding 65 is provided during the delay period, when relay 53 is closed, for the remaining part of the pumping. This is desirable since the intermediate range circuit is still closed when resuming pumping. Thus, a shorting circuit for relay 65 is set up as follows: wire 94, junction 93, switch 92, junction 15, wire 90, contacts 89 and 86, wire 85, current limiting resistor 85a, contacts 84 and 79, wire 80 to the left terminal of winding 65.

During the time that counter 10 is at intermediate range, relay 104 is energized. This is fast acting and breaks the circuit for wire 105. This is desirable because the right hand part of winding 98 of relay 100 and winding 21 of relay 22 are effectively in series and may be energized. It is preferred to design these relay windings so that if in series they would not be energized very strongly and before they would have time to act upon their armatures, relay 104 would have opened this series connection.

When delay relay 53 opens in preparation for resumed pumping the short-circuit around relay winding 65 is broken. Hence, relay 64 moves back to the position shown in the drawing due to the fact that the intermediate range circuit within counter 10 is still closed. At the same time, pumping resumes due to the actuation of relay 100. This circuit may be traced from junction 93, along wire 103, through relay winding 98, return wire 101 through contacts 82 and 79 of delay relay 53, along wire 80 to wire 24 and thence through counter 10 to wire 14 and back to junction 93. When pumping resumes, the counter resumes operation and moves over the remainder of the range (thereby releasing relay 104) and the system continues to the end of its operating cycle in a normal manner. If one or more intermediate outputs for counter 10 are provided, pumping will automatically stop for each such intermediate output. The fact that the system is on intermediate range is indicated by lamp 92a being lit, this occurring when switch 92b is closed, completing a circuit for the lamp.

The selection of the valve in the brine line for operation is indicated by lamps 124 and 125, these lamps having their circuits completed through movable contact 27 of relay 22 and movable contact 23 of the selector switch.

If it is desired to have only one of the valves operating without automatically changing from one valve to another, selector switch 46 is moved, the movable contacts 50 and 130 being moved either to the right or to the left, as desired. Thus when movable contact 50 is moved to the left, the normal circuits, previously traced for selecting a valve and controlled by the position of movable contact 26 of relay 22, are destroyed and instead a shunt from contact 50 to contact 43 is established. Similarly, if contact 50 is moved to touch contact 44, a shunt circuit for valve No. 2 is established and this valve will be energized, irrespective of the condition of relay 22. The same considerations apply to lamps 124 and 125, each of these lamps being selectively energized in the manual position of the switch.

When a ham has been pumped, lamp 123 will be energized, this lamp being connected across winding 21. When start switch 55 is closed and counter 10 is reset from a full range position, it is clear that lamp 123 will go out.

Referring now to Figures 3 to 6 inclusive, a complete system illustrating the invention is disclosed. In this system, light source 1' and diaphragm 1a provided with a slit provides a beam controlled by disk 3' and cooperating with photocell 7'. 4' is a scale of conventional character having a rotating dial or disk 3', the angular movement of which is linearly proportional to the weight on the scale. The ham to be pumped is placed on the scale, a brine feed nozzle having been inserted in an appropriate artery. After the scale has come to rest, the pumping of brine automatically starts, as above described and as the ham increases in weight, the dial or disk 3' rotates. The disk 3' is turned from its plane for convenience to illustrate the graduated markings. The disk 3' is provided near its edge with an annular band with alternate light transmitting and opaque sectors. Beginning at one end 3a of its range, the successive light transmitting and opaque regions are narrow in width and as they progress away from end 3a, which corresponds to the low weight part of the range, the angular width of the light and dark graduations become greater. The angular width of these successive light and dark sectors increases logarithmically so that theoretically all light and dark bands are dissimilar in width. Actually, a number of adjacent light and dark bands may be alike. The angular movement of disk 3' being proportional to the weight on the scale, the disk may be coupled to the usual needle or indicating drum on conventional scales. Since the light and dark sectors on the portion of the disk intercepting the light beam are on a logarithmic scale, the number of pulses of light transmitted bears a constant relationship to the proportional increase in weight on the scale.

As more fully explained in the Campbell application, it is necessary for the light beam to have a resolution good enough so that each transparent or opaque element can function as a light valve. In addition, the relay part relating to stepping must be fast enough to keep up with disk movement during processing.

It is understood that the logarithmic characteristic of coupling between a scale member and a disk having uniform graduations, as in the Campbell application above referred to, may be used here, if desired.

The photo-electric cell 7' feeds pulses to amplifier 8' and the amplifier in turn feeds pulses to the winding of relay A. This relay has movable contact A1 operating between normal contact A2 and off-normal contact A3. Contact A1 is connected by wire AL1 to line L1 forming one side of the alternating current supply line for operating the entire system. Contacts A2 and A3 are connected respectively by wires AB and AC to the lower terminals of the windings of relays B and C. These two relays are pulsing relays having movable contacts B1 and C1 cooperating with off-normal contacts B3 and C3 respectively. The movable contacts of these relays have a slow make and quick break. This is to give the mechanical parts of the stepping relay time to act. The movable contacts of these two relays are connected by wires 1B and 1C to junction BCD. Contact B3 is connected by wire 3B to junction BCK while contact C3 is connected to this same junction, this junction being connected to wire CK going to junction ECU. The upper terminals of the windings of relays B and C are connected together to wire L22 going down to L2 which is the other side of the power line.

Junction BCD is connected by wire CD to contact D23 of relay D. This relay has two movable contacts D11 and D21, the former operating between contacts D12 and D13 and the latter between contacts D22 and D23. Relay D has winding D4 cooperating with armature D5, this armature actually operating the movable contacts. Relay D is of the interlocking type having two windings D4 and D44. The first winding D4 is adapted to pull the contacts down in which position they remain irrespective of the condition of winding D4. The contacts are unlocked by energizing D44. A simple interlocking arrangement as shown consists of armature D45 having notched portion D46 which is adapted to engage the end of armature D5 and maintain the same locked when winding D4 is energized. Upon energization of winding D44 armature D5 is released.

The lower terminal of locking winding D4 of relay D is connected by wire DE to terminal EC1 of stepping switch E, forming part of the counting system referred to generally as 10 in connection with Figure 1. This stepping switch E is of the type adapted to rotate in one direction and has four banks of contacts EA, EB, EC and ED. These contacts range from 1 to 20 in each bank and cooperate with non-bridging wipers Ea, Eb, Ec and Ed. Wipers Ea and Ec are angularly aligned with the remaining two wipers being also angularly aligned but 180 degrees away from Ea and Ec. Wipers Ea and Eb are connected together. Wipers Ec and Ed are also connected together. The contact banks extend for almost 180 degrees so that only one aligned pair of wipers bears on contacts at any one time.

The wipers are stepped forward, one contact at a time, by means of ratchet Er, in this particular instance having 40 teeth. This ratchet is operated by pawl Ep carried by rod ES, which is under spring tension. This rod carries an armature cooperating with E4, the winding of the stepping relay. The advance of the ratchet and wipers occurs upon deenergization of winding E4, the energization of winding E4 serving to slide the pawl over one tooth along the ratchet. Upon deenergization the spring pulls ES away from E4 and advances the ratchet. Rod ES also operates movable contact Et of a normally closed switch. This switch is opened when winding E4 is energized and remains closed at other times. Switch Et is connected between terminal E41 and wipers Ea and Eb. Terminal E42 of the stepping switch winding is connected by wire EL1 going to current supply line L1. Terminal E41 is connected by wire CE to junction ECU.

Referring now to the contact banks in stepping switch E, the contacts are numbered clockwise. Contacts 2 to 20 inclusive of the A bank are connected together and all contacts 1 to 20 inclusive of the B bank are connected together and also connected to the interconnected contacts in the A bank. Contact EA1 is dead.

Wipers Ec and Ed are connected by wire EL2 to junction ELW. The interconnected contacts on the A and B banks of stepping switch E are connected by wire EK to a contact in relay K to be described later.

Stepping switch E is adapted to home to number 1 contact prior to the stepping of the switch by impulses originating in the photo-electric cell. The stopping position of the relay due to impulses from the cell is determined by selector switch F having two series of contacts FA and FB cooperating with wipers Fa and Fb respectively. Certain contacts in C and D banks of relay E are connected to the contacts in selector switch F by cable EF. This cable consists of wires a to r inclusive, corresponding letters at stepping switch E and selector switch F indicating the connection between contacts. Selector switch F is provided to determine the percentage rate to be added to a ham, the various settings of the wipers Fa and Fb on switch F determining the desired percentage.

The percentage rate is a function of the number of light (or dark) bands on disk 3' to be included in one operating cycle when the disk moves as brine is added.

Wiper Fa is connected by wire FG to a wire in relay G while wiper Fb is connected by wire FH to one terminal of winding of H4 of an electrically actuated counter H. Such counters are well known and may be stepped forward a unit at a time for the purpose of showing how many hams have been treated. The other terminal of winding H4 is connected by wire GH to the lower terminal of winding G4 of relay G. This relay is the same type of interlocking relay as relay D with winding G4 being provided for locking and winding G44 being provided for releasing the contacts. The connection from wire FG is to wire 1G extending between movable contact G1 and one terminal of winding G44. Movable contact G1 cooperates with fixed off-normal contact G3 connected by wire 3G to switch GV.

The lower terminal of winding G4 is connected by wire DG to junction DGQ from which point a connection is taken to one terminal of winding D44. Winding D4 has its top terminal connected through junction DKM to wire DM and also by wire 1K to the lower terminal of winding K4 of relay K. Contact D11 is connected by wire DK to contact K12 of relay K while contact D13 is connected by wire 13D to junction DTU. Contact D23 is connected by wire CD to junction BCD, while contact D21 is connected by wire DL2 to junction DKL. From junction DKL wire 2K goes to the upper terminal of K4 while from this same junction wire KL2 goes to a terminal of delay relay M. Contact D22 is connected by wire KD to junction DKP. Contact D23 is also connected by wire 2DK to junction DKU. This junction is connected by wire 3K to off-normal contact K33 cooperating with movable contact K31. K31 is connected by wire 31K to junction KCU and wire KC to junction ECU. Contact K12 cooperates with movable contact K11, this movable contact being connected by wire KL1 to line L1. Movable contact K11 carries contact K23 cooperating with movable contact K21. As is clearly seen from the drawing (Figure 5), K21 is adapted to close against K23 and move K11 away from K12. Movable contact K41 is connected to junction DKP. Movable contact K21 is connected by wire KM to a terminal of time delay relay M.

Referring now to time delay relay M, this is a time delay relay having movable contact M1 normally resting against fixed contact M2. Contact M1 is maintained in closed position by roller M5 riding on cam M6. Cam M6 is carried by shaft M7 normally biased to the position shown by coil spring M8 but adapted to be turned against the spring in an anticlockwise direction. Shaft M7 has at its end one member M9 of a clutch having cooperating element M10. Part M9 of the clutch is normally disengaged but may be moved into engaging position with part M10 by means of winding M4. Motor M12 is adapted to drive part M10 of the clutch, it being understood that motor M12 tends to drive cam disk M6 counterclockwise and when the clutch is released, spring M8 returns disk M6 to the position shown. When cam disk M6 has been rotated through a predetermined angle, roller M5 drops at the fall of the cam disk and permits contact M1 to open. It is understood that motor M12 is of a constant speed type so that accurate time control may be obtained. Winding M4 and contact M1 have common terminal M21 while motor M12 and winding M4 have common terminal M22. The other terminal of motor M12 is connected to contact M2 at terminal M24. Contact M22 is connected by wire ML2 to L2. Terminal M24 is connected by wire DM to junction DKM and is connected by wire MN to the top terminal of winding N4 of relay N. Lamp J2 is connected between L2 and the top terminal of N4. The other terminal of winding N4 is connected by wire NL2 to L2.

Relay N has movable contact N1 cooperating with normal contact N2. Movable contact N1 is connected by wire NL1 to main power line wire L1. Wire NL1 continues on from contact N1 as wire PL1 up to terminal P5 of overtime protection relay P. Contact N2 is connected by wire NP to contact P22 of relay P. This relay has winding P4 having the lower terminal connected to terminal P5. Winding P4 cooperates with a pair of movable contacts P11 and P21 operating respectively between contacts P12 and P13 on the one hand and with normal contact P22 on the other hand. Movable contact P11 is connected by wire to terminal P6 of the relay. Terminal P6 is connected by wire KP to junction DKP and is connected to bimetallic element P7 cooperating with off-normal contact P8 and adapted to be closed against it when heated. Contact P8 is connected to junction P9 which is connected to the upper terminal of winding P4 and is also connected to contact P13. Bimetal element P7 has heater 12P thereover, this being connected between terminal P5 and contact P12. Terminal P6 of relay P and contact P21 are connected by wires PQ and 2PQ respectively to terminals of winding Q4 on brine line select ratchet relay Q. This relay has winding Q4 operating on armature Q5 carrying pivoted arm Q6 cooperating with a series of pins Q7 on ratchet Q8. Ratchet Q8 has an even number of teeth, half the number of pins Q7. Thus every time winding Q4 is energized, ratchet Q8 is advanced one-half a tooth so that spring Q9 riding on the teeth will be alternately raised or lowered, thus closing or opening various contacts for each energization of the relay.

Relay Q has movable contacts Q11 and Q21, the former operating between contacts Q12 and Q13 and the latter between Q22 and Q23. Wires PQ and 2PQ are connected to the lower and upper terminals of Q4 respectively. The lower terminal of Q4 is connected by wire GQ back to the upper terminal of winding G4. The upper terminal of winding Q4 is connected by wire DQ to junction DGQ. Movable contact Q11 is connected by wire QR to terminal R23 of two-section switch R for selecting manual or automatic operation of the brine lines. Switch R has movable contacts R1 and R21 respectively cooperating with fixed contacts R2, R3, R4, on the one hand and with R22, R23 and R24 on the other hand. In the left hand position of the R movable contact, valve X will only be permitted to operate. In the right hand position, valve Y will only be permitted to operate, while in the center position as shown alternate valve operation will be permitted.

Returning to relay Q, contact Q12 is connected by wire XQ to a terminal of the winding of brine valve X, the other terminal of this winding being connected to XL2 going to junction LXY, this junction being connected to line L2. Referring back to relay Q, contact Q12 is connected by wire 22R to switch point R22 while contact Q13 is connected by wire 13Q to junction QRY. From this junction wire YQ goes to one terminal of the winding of brine valve Y, the other terminal of this winding being connected by wire YL2 to junction LXY. Junction QRY is also connected by wire 13QR to switch point R24. Contact Q21 is connected by wire 3R to contact R3 of relay R. Contact Q22 is connected by wire 22Q to junction JQR while contact Q23 is connected by wire 23Q to junction JRQ. From junction JQR wire 2R goes to contact R2 while another wire from this same junction goes to lamp J4, the circuit continuing to branch L26. L26 is connected by wire L25 to line L2. Junction JRQ is connected by wire 4R to contact R4 and is also connected to lamp J5 going to L26.

Movable contact R1 is connected by wire RL1 to junction LRS on wire L1 while movable contact R21 is connected by wire 21R to junction JRU. From this junction, a connection goes to lamp J3 connected to L26 while another wire from this junction is RU going to a contact of interrupt control relay U.

Referring to junction LRS, lamp J1 is connected between this junction and line L2. From junction LRS, wire SL1 goes to contact S13 of start button S. Cooperating with S13 is movable contact S11 connected by wire ST to lower terminal of winding T4 of start relay T. Start button S also has normally closed contacts S21 and S22. Contact S21 is connected through lamp J7 to wire L25 while contact S22 is connected by wire DS back to contact D12.

Wire L25 is also connected to contact SS3 of stop switch SS. This switch has movable contact SS1 bearing against normal contact SS2. Movable contact SS1 is connected by wire DSS back to the left hand terminal of winding D44. Contact SS2 is connected by wire FSS to contact Fb.

Referring now to relay T, this has movable contacts T11 and T21 cooperating respectively with off-normal contacts T13 and T23. Winding T4 has the upper terminal thereof connected by wire TL2 to wire L2. Contact T13 is connected by wire MT to junction M21. Contact T23 is connected by wire GT to the right hand terminal of winding G44. Movable contact T21 is connected by wire 21T to junction DTU. Contact T11 is connected by wire TU to movable contact U31 of relay U. Relay U has winding U4 and movable contacts U11, U21, and U31. Contact U11 is connected to the lower terminal of winding U4 and by wire 11U to junction DTU. Movable contact U21 is connected by wire 21U to junction KCU. Cooperating off-normal contact U23 is connected by wire KU to junction DKU. Terminal U32 is connected by wire DU to contact D12.

The lower terminal of winding U4 is connected by wire UV to junction UWV while the upper terminal of this winding is connected by wire VU to junction UVW. Contact U12 is connected by wire RU to junction JRU. Contact U13 is connected by wire 2UV to contact V21 of relay V.

Contact U33 is connected by wire 33U to the lower terminal of U4 and to wire UV.

Referring now to relay V, junction UWV is connected to the lower terminal of winding V4 while the upper terminal is connected by wire VL2 through switch VL22 to wire L26. The upper terminal of winding V4 is also connected by wire I3V to contact V13 cooperating with movable contact V11. Contact V11 is connected to contact V33. Movable contact V21 operates between contacts V22 and V23. V22 is connected by wire 22V to lamp J6 and thence to L26 going finally to L2. V23 is connected by wire 23V to lamp J8 also connected to L26. V32 is connected by wire 32V to switch GV. Switch GV is connected by wire 3G to contact G3 of interlock relay G.

From junction UWV wire VW goes to the lower terminal of W4 of relay W. The upper terminal of this winding is connected to contact W3, this contact being connected by wire 3VW to junction UVW. Movable contact W1 cooperates with contact W3 and is connected by wire 2VW to contact V33 of relay V. Contact W1 is also connected by wire WL2 to junction ELW.

The operation of the system will now be described. In general, if the system has been used previously for processing ham or the like, stepping switch E will not be in the home position shown but will be in some position where the wipers have progressed to the desired increase in weight. Otherwise, the parts will be in the condition as shown in the drawings. First a general description of the operation of the systems will be given and then complete circuits will be traced out.

Assuming that selector switch R is in the automatic position with the movable contacts in the center as shown, start button S is pressed after a ham has been placed upon the scale and the needle inserted into the proper place. Lamp J1 will be burning to indicate that lines L1 and L2 are alive. In addition, lamp J4 will be burning to indicate that valve X is to be opened for the coming operating cycle. When switch S is closed momentarily, lamp J2 is lit to indicate the beginning of a delay period. Relay T is closed during the time that switch S is pressed down. At the same time, lamp J7 is extinguished, this lamp going on at the termination of a pumping cycle.

When switch S is operated at the beginning of a cycle, relay D is energized through energization of K and stepping switch E reaching a home position and remains locked for the entire operating cycle. Relay K is also energized but only during the delay period. Time delay relay M is energized and operates only for the delay period, the contacts between M21 and M24 being closed for the delay period. These contacts are opened at the end of the delay period and are then again reclosed when the motor and clutch return to normal position in preparation for a new cycle. However, the closure of these switch contacts does not affect anything since the circuits controlled thereby are not alive after the delay period. Relay N is also energized during the delay period.

The closure of relay K completes a circuit whereby stepping switch E goes to a home position. This takes a short time, a matter of one or two seconds with the delay period itself generally running about four or five seconds. After stepping switch E reaches home, D is energized to lock it. It should be noted that relay D remains locked until the end of the operating cycle. This makes its possible to divide a pumping cycle into two parts, as will be more fully described later. During the delay period, relays B and C have their contacts short-circuited so that any impulses from relay A will be ineffective. Inasmuch as the scale, in this period, is coming to an equilibrium to indicate base weight, it is undesirable to have any pulses from the photo-electric system.

At the end of the delay period, relay K is de-energized and returns to the position shown. When this occurs, the circuit is completed through the proper valve winding, in this case winding X, and brine begins to flow. At the same time the short-circuit around the contacts of the pulsing relays B and C is removed. The pulses from these two relays are communicated to stepping switch E and the wipers step along the contact banks in accordance with pulses. When the wipers have reached a point corresponding to a full charge of brine, a circuit is completed through winding D44 of relay D for releasing this relay. When this occurs, the flow of brine is cut off while at the same time relay Q is operated to move the contacts downwardly to the position shown. This prepares the system for the next operating cycle when valve Y will be used. During the brine pumping, lamp J3 is energized indicating that brine is flowing. At the end of the brine filling cycle, this lamp is extinguished and lamp J7 is energized, indicating that the pumping cycle is complete. At the completion of the pumping cycle, relay H operating the counter is energized so that the ham may be registered as having been pumped. Relay G has winding G4 energized at the end of a pumping cycle.

It will be noted that relay P is not used, this relay only coming into play to protect the windings of other relays energized for an excessively long time. Relays G, U, V and W are also not used for normal pumping cycles.

At any time during any part of an operating cycle, it is possible to either stop or interrupt the cycle. If the cycle is interrupted, switch VL22 is operated. This energizes relay V which causes relays U and W to operate. This simply closes the brine valve which may be open. Nothing else is changed and the cycle may be resumed by operating the start switch S. Normal delay period activities occur except that no reset of stepping switch E occurs. Suitable lamps are energized for showing interruption and resumption of pumping.

If complete stoppage is desired, switch SS is operated. This acts upon the system in the same manner as the completion of a pumping cycle and the system is conditioned for a new operating cycle. Counter H, however, is not actuated when stoppage is effected by operation of switch SS.

In case it is desired automatically to divide the pumping cycle into parts, as when the anterior femoral and deep femoral arteries of a ham must be pumped separately, it is necessary to operate toggle switch GV to a closed position. This may be done at any time before the desired proportion of the brine required by a ham has been supplied. The start button is moved as usual, with the various relays operating in a normal manner. At the end of the initial part of the pumping cycle, light J6 is illuminated and relays U and W are locked. The brine is stopped. When the start button is pressed again, normal delay period activities occur with the exception that stepping switch E does not home. Relay G is also released. At the end of the delay period, the brine flow is resumed through the same valve as before and at the end of the cycle, counter H is operated in a normal manner. Relays G and Q are also operated at the end of the complete cycle. In the event that the next cycle is to be a normal cycle, it will be necessary to open toggle switch GV prior to the operation of start button S.

In the event that only one needle is to be used, selector switch R is turned either to the left or right depending upon which valve is desired to be operated. Then starting switch S may be operated and, if desired, intermediate cycle switch GV closed. The system operates normally with the exception that alternate use of the valves is not provided.

The detailed description of the operation of the system, together with the description of the circuits involved will now be given. Assume that the system is as shown, with stepping switch E in the home position. This will only be true when the system is first assembled. As shown, lamp J1 (Figure 6) will be lit, this circuit running from L2 through lamp J1 to junction LRS on line L1. It is assumed, of course, that line L1—L2 will have a line switch and fuses. With the selector switch R as shown in the automatic position, lamp J4 (Figure 5) will be lit indicating that valve X will be energized at the succeeding cycle. The circuit may be traced from L2 to wire L25 to L26, through lamp J4 to junction JQR, wire 22Q to contact Q22, contact Q21, wire 3R, contact R3, movable contact R1, wire RL1 to L1. Lamp J7 (Figure 6) is also energized and this circuit may be traced from wire L25 which is connected to line wire L2, through lamp J7, through normally closed contacts S21 and S22, along wire DS to contacts D12 and D11, wire DK, through contacts K12 and K11 to KL1 and line wire L1.

Now assume that start button S is momentarily operated, a ham with a needle inserted in the appropriate artery having been put on the scale platform. The circuit through lamp J7 will be interrupted at contacts S21 and S22. At the same time, relay T will have its winding energized. This circuit runs from L1, SL1, through switch contacts S13 and S11, wire ST, winding T4 and wire TL2 to L2. When T11 closes against T13 relay K is operated.

This circuit for relay K may be traced as follows: L1, KL1, contacts K11 and K12, wire DK, contacts D11 and D12, DU, contacts U32 and U31, wire TU, contacts T11 and T13, MT to M21, through the normally closed switch to M24, wire DM, point DKM, through K4, wire 2K to DKL, KL2, ML2 and L2. When relay K closes, a holding circuit to retain K closed only during the delay period is established. This may be traced as follows: L1, KL1, K11, K23, K21, KM, M21, M24, DM, DKM, K4, and as above to L2. Lamp J2 goes on, this being connected between M24 and L2. By having contact K23 close against K21 before K12 breaks from K11, stable operation of K results.

With relay K closed, motor M12 operates. This circuit is as follows: L1, KL1, K11, K23, K21, KM, M21, through the switch in delay relay M to M24, through motor M12, M22, ML2 to L2. Clutch winding M4 is also energized since it is across line contacts M21 and M22. With K closed, stepping switch E homes. This may be traced as follows: KL2, DKL, DL2, D21, D22, KD, DKP, K41, K43, EK, to contacts 1 to 20 inclusive of the B bank and contacts 2 to 20 inclusive of the A bank, to wiper Ea or Eb (whichever happens to be available), Et, E4, EL1. The stepping switch homes, with Et breaking the circuit each time the wipers move a step. When wiper Ea reaches dead contact EA1 the stepping action ceases.

When stepping switch E reaches home, relay D has winding D4 energized and the relay is locked. This circuit may be traced as follows: KL1, K11, K23, K21, KM, M21, M24, DM, DKM, D4, DE, EC1, wiper Ec, EL2. With K still closed, a short circuit on the output of relays B and C is provided as follows: B1 and C1 to BCD, CD, 2DK, DKU, 3K, K33, K31, KCU, KC, ECU, CK, to B3 and C3.

When the motor of relay M causes the switch in this relay to open, this ends the delay period. Motor M12 is deenergized. K4 is also deenergized and lamp J2 goes out. The brine valve X is now opened. The circuit is as follows: KL1, K11, K12, DK, D11, D13 (Relay D is locked for the entire pumping cycle), 13D, DTU, 11U, U11, U12, RU, JRU, 21R, R21, R23, QR, Q11, Q12, XQ, XL2, L2. If relay Q were in its other position, the circuit would continue from Q11 to Q13, 13Q, QRY and YQ to Y.

The release of relay K removes the short on the contacts of B and C by causing contacts K33 and K31 to separate. Brine flowing into the ham causes disk 3' to turn, the logarithmic markings on it intercepting the path of the light beam impinging on photo-cell 7'. This causes pulses to be generated at the photo-electric cell and causes relays B and C to pulse alternately. This operation of relays B and C steps E along. This stepping circuit is as follows: L2, ML2, KL2, DKL, DL2, D21, D23, CD, B1 or C1, B3 or C3, CK, ECU, CE, E4, EL1, L1. As the stepping switch advances with increased weight of ham, wiper Ec or Ed reaches a point on bank EC or ED (which point is determined by the setting of switch F) when the brine is to be cut off. As shown, when Ed reaches ED6, a circuit for wire f to contact Fb is established. The complete circuit is as follows: EL2, Ed (it could be Ec for a different setting of F) ED6, wire f, Fb, FSS, SS2, SS1, DSS, D44, DGQ, DQ, 2PQ, P21, P22, NP, N2, N1, NL1, L1. This causes D to release and opens the valve winding circuit at D11, D13.

When E trips D as above, it also operates counter H. Thus going back to Fb, a circuit continues as follows: FH, H4, GH, DG, DGQ, and as above to L1. Also relay Q will be operated to change valves. This circuit may be traced as follows: DL2, D21, D22, KD, DKP, KP, PQ, Q4, 2PQ, P21, P22, NP, N2, N1, L1. At the end of each cycle, relay G will always be energized to lock it. It is only released during an intermediate cycle operation. Thus since G4 is in shunt to Q4, it will be energized when Q4 is energized.

Pumping may be stopped by operating switch SS. This causes D to release. The circuit for this is as follows: L25, SS3, SS1, DSS, D44, DGQ, DQ, 2PQ, P21, P22, NP, N2, N1, NL1. When D releases, pumping ceases as previously explained.

For interrupting pumping, switch VL22 is closed. A circuit for closing relay V is established as follows: L26, VL22, VL2, V4, UWV, UV, 11U, DTU, 13D, D11, DK, K12, K11, KL1. A holding circuit for relay V is established from the L2 side of the line as follows: L22, ELW, WL2, 2VW, V33, V11, V13, 13V, V4 and so on as above to L1. When V closes, U will follow suit. Thus energy from L2 will go to 2VW as before, then V33, V31, UVW, VU, U4, 11U, DTU, 13D, D13, D11, DK, K12, K11 and L1. Relay W will also close. Thus going back to V31, a circuit will continue as follows: UVW, 3VW, W4, VW, UV, 11U, DTU and as before to L1. Inasmuch as the valve energizing circuit goes through U11 and U12, pumping will cease when relay U closes. When start switch S is closed after an interruption, relay K will be closed in the normal fashion during a delay period and break the circuits for the windings of U, V and W. This is true since the return circuit to L1 involves K11 and K12. Since relay D still remains locked during interruption, step switch E will not home as the homing circuit involves contacts D21 and D22.

Now assume that intermediate range action is required. Switch GV (Figure 4) is closed. Normal starting action occurs. It should be remembered that relay G has G4 energized after each complete operating cycle, so that this relay starts an operating cycle in a locked condition. Now when the desired intermediate point is reached on the stepping switch, wiper Ec or Ed completes circuits through Fa. The complete circuits are as follows: EL2, Ec and EC13 (as shown in the drawing, for example) wire o, wiper Fa, FG, G1, G3, 3G, GV, 32V, V32, V31 to junction UVW. From UVW, one circuit continues along 3VW, W4, VW, UV, 11U, DTU, 13D, D13, D11 (D remains locked over a complete operating cycle irrespective of intermediate range action) DK, K12, K11 and L1. Thus W is closed. The other circuit continues from UVW, VU, U4, 11U and on to L1 as before. This closes U. When U closes, the valve circuit through U11 and U12 is broken and brine flow stops. When W closes, a holding circuit is completed as follows: L22, ELW, WL2, W1, W3, W4, VW and so on to L1. When U closes and V still remains open, lamp J6 goes on to indicate that the intermediate range limit has been reached. This circuit is as follows: L26, J6, 22V, V22, V21, 2UV, U13, U11, 11U and so on to L1.

When the needle position has been changed in the ham for completing pumping, start button S is pressed. The normal delay action occurs except that E does not home due to relay D remaining locked. As soon as K closes, the circuits for U and W energizing windings are broken and these relays release. Hence, when K releases at the end of the delay period, normal pump control action occurs. It should be noted that when S is closed to resume pumping, a circuit through G44 is established to release G. This circuit is as follows: beginning with Fa as a live wiper (relay E is still at intermediate range position) G44, GT, T23, T21, 21T, DTU, 13D, D13, D11, DK, K12, K11, L1. The system now continues in a normal manner and at the end of the range the active brine supply valve is closed and the inactive valve is readied.

In the event that operation of a particular brine supply valve is desired, switch R is moved to left or right. If moved from the central position shown, contacts Q11 and Q21 become dead. Thus the critical part of the pumping circuit may be traced as follows: beginning at U12, wire RU, JRU, 21R, R21, R22, (or R24) 22R (or 13QR) XQ (or YQ) and X (or Y) to L2. If valve X is selected with R2 and R22, as live contacts, then a lamp indicating circuit will be established as follows: RL1, R2 (or R4) 2R (or 4R) J4 (or J5) and L26.

The currents for windings Q4 and G4 go through contacts P21 and P22. If these coils are energized too long, protective relay P will open these contacts. Thus as long as D is open, a heating circuit for 12P will be established. This may be traced as follows: L2, ML2, KL2, DL2, D21, D22, KD, KP, P6, P11, P12, 12P, P5 to L1. If the current through 12P flows too long, bimetal P7 will close against P8 and circuit through P4 will be established as follows: L2 to KP as before P6, P7, P8, P9, through P4 to P5, then to L1. This will break P21 from P22 and open the circuits for Q4 and G4. At the same time P will lock itself in as follows: P6, P11, P13 to P9. After the trouble is located, normal closing of D at starting will release P and the system will function normally.

Although the pulse generating system of the present invention has been described in connection with a complete system for the control of injection of pickling brine into a ham or similar article, it will be understood that it may be employed apart from such a system; for example, in conjunction with a conventional counter or indicator system, to indicate a proportional change in weight of an article irrespective of its actual weight.

What is claimed is:

1. A control system responsive to the weight of an article being processed during which the weight of said article is to be changed by a predetermined proportion of the base weight, said system comprising a rotary control member movable linearly over a range in proportion to the weight of said article, said control member having an annular control portion divided into discrete portions with the angular extent of each of such divided portions being proportional to the angular distance of a particular portion from a predetermined starting portion so that said control member has such discrete portions logarithmically proportioned, an electric pulse generator coupled to said control member for generating a pulse for each weight increment having a substantially constant ratio to the base weight of said article, an electrical counting system, means for feeding said pulses to said counting system for counting up to a predetermined number of pulses, means for preventing operation of said counting system during a preliminary delay period when said member is moving to a position of equilibrium corresponding to article weighing prior to processing, means for setting said counting system to a starting position at a time between successive complete processings, means controlled by said operation preventing means for initiating processing at the end of said delay period, and means controlled by said counting system for terminating said processing after a predetermined number of counting steps.

2. A control system responsive to the weight of an article being processed during which the weight of said article is to be changed by a predetermined proportion of the base weight, said system comprising an element movable linearly over a range in proportion to the weight of said article, an electric pulse generator coupled to said member, said generator having a logarithmic operating characteristic for generating a pulse for each weight increment having a substantially constant ratio to the base weight of said article, an electrical counting system, means for feeding said pulses to said counting system for counting up to a predetermined number of pulses, means for preventing operation of said counting system during a preliminary delay period when said member is moving to a position of equilibrium corresponding to article weighing prior to processing, means for setting said counting system to a starting position between successive complete processings, means controlled by said operation preventing means for initiating processing at the end of said delay period, means controlled by said counting system for interrupting said processing after a predetermined number of counting steps, means controlled by said counting system for terminating said processing after additional predetermined counting steps, and switch means for disabling said means for process interruption whereby an article may be selectively processed in one continuous operation or may be processed in discrete operations having desired weight varying relation to each other.

3. A control system responsive to the weight of an article being processed, said system comprising a member movable linearly over a range in proportion to the weight of said article, said member carrying logarithmically spaced graduations consisting of alternate transparent and opaque portions, a light source and photo-cell cooperating with said graduated member, an electric counting system, means between said cell and counting system for operating said counting system as said graduated member moves with article weight variation, means for disabling said counting system during a preliminary delay period when said member is moving to a position of equilibrium corresponding to article weighing prior to any processing operation, means for setting said counting system to a starting position between successive complete processings, means controlled by said disabling means for initiating processing at the end of said delay period, means controlled by said counting system for interrupting said processing after one predetermined number of counting steps, means controlled by said counting system for terminating said processing after additional predetermined counting steps, and switch means for disabling said means for process interruption whereby an article may be selectively processed in one continuous operation or may be processed in discrete operations having desired weight varying relations to each other.

4. A control system responsive to the weight of an article being processed, said system comprising a member movable linearly over a range in proportion to the weight of said article, said member carrying logarithmically spaced graduations consisting of alternate transparent and opaque portions, a light source and photo-cell cooperating with said graduated member, a stepping switch, means between said cell and stepping switch for advancing said switch as said graduated member moves with article weight variation, a starting switch for initiating a processing cycle including an initial delay period for allowing said member to reach a position of stable equilibrium corresponding to the weight of said article and processing period when said article is changing weight, relay means controlled by said starting switch for disabling said stepping switch advancing means during said delay period, means for setting said stepping switch to a starting position between successive complete processings, relay means controlled by said disabling means for initiating processing at the end of said delay period, and means controlled by said stepping switch for terminating said processing after a predetermined number of switch steps.

5. A control system responsive to the weight of an article being processed during which the weight of said article is to be changed by a predetermined proportion of the base weight, said system comprising a member movable linearly over a range in proportion to the weight of said article, an electric pulse generator coupled to said member, said generator having a logarithmic operating characteristic for generating a pulse for each weight increment having a substantially constant ratio to the base weight of said article, an electrical counting system, means for feeding said pulses to said counting system for counting up to a predetermined number of pulses, a starting switch for initiating a processing cycle including an initial delay period for allowing said member to reach a position of stable equilibrium corresponding to the weight of said article, relay means controlled by said starting switch for disabling said counting system during said delay period, means for setting said counting system to a starting position between successive complete processings, relay means controlled by said disabling means for initiating processing at the end of said delay period, means controlled by said counting system for interrupting said processing after a number of counting steps, means controlled by said counting system for terminating said processing after additional counting steps and switch means for disabling said means for process interruption.

6. A control system responsive to the weight of an article being processed, said system comprising an element movable over a range in proportion to the weight of said article, a member carrying a series of graduations consisting of alternate transparent and opaque portions, a light source and photo-cell cooperating with said graduated member, a stepping switch, means between said cell and stepping switch for advancing said switch as said graduated member moves with article weight variation, a starting switch for initiating a processing cycle including an initial delay period for allowing said member to reach a position of stable equilibrium corresponding to the weight of said article and processing period when said article is changing weight, relay means controlled by said starting switch for disabling said stepping switch advancing means during said delay period, relay means controlled by said starting switch for setting said stepping switch to a starting position during said delay period, relay means controlled by said disabling means for initiating processing at the end of said delay period, means controlled by said stepping switch for interrupting said processing after one predetermined number of switch steps, means controlled by said stepping switch for terminating said processing after additional switch steps and switch means for disabling said means for process interruption.

7. A control system responsive to the weight of an article being processed, said system comprising a member movable over a range in proportion to the weight of said article, said member carrying logarithmically spaced graduations consisting of alternate transparent and opaque portions, a light source and photo-cell cooperating with said graduated member, a stepping switch, means between said cell and stepping switch for advancing said switch as said graduated member moves with article weight variation, a starting switch for initiating a processing cycle including initial delay periods prior to any processing for allowing said member to reach a position of stable equilibrium corresponding to the weight of said article and processing periods when said article is changing weight, relay means controlled by said starting switch for setting said stepping switch to a starting position during said delay periods, relay means controlled by said disabling means for initiating processing at the end of said delay periods, means controlled by said stepping switch for interrupting said processing after one predetermined number of switch steps, means controlled by said processing after additional predetermined switch steps and switch means for disabling said means for process interruption whereby a processing cycle may be selectively continuous or in discrete steps having predetermined weight varying relation to each other.

8. In an article processing system having a processing cycle whose total duration is a function of the weight of the article being processed plus any delay periods, said processing changing the weight of said article, two processing members adapted to act on two articles for processing the same, said system being adapted to process only one article at one time while another article is being readied at the same time for processing, an element movable linearly over a range in proportion to the weight of the article being processed, means controlled by said element for generating an electrical pulse corresponding to a predetermined proportional weight increment, a counting system for receiving said pulses, means for disabling said counting system during a preliminary delay period prior to processing, means for setting said counting system to a starting position between successive complete processings, interlocking means for selecting which processing member is to be used, means controlled by said disabling means for activating the selected processing member at the end of a delay period, and means controlled by said counting system for deactivating the selected processing member.

9. In an article processing system having a processing cycle whose total duration is a function of the weight of the article being processed plus any delay periods, said processing changing the weight of said article, two processing members adapted to act on two articles for processing the same, said system being adapted to process only one article at one time while another article is being readied at the same time for processing, an element movable over a range in proportion to the weight of the article being processed, means controlled by said element for generating an electrical impulse corresponding to a predetermined proportional weight increment, a stepping switch for receiving said pulses and adapted to move one step for each pulse, means for disabling said stepping switch during a preliminary delay period prior to processing, means for setting said stepping switch to a starting position between successive complete processings, interlocking means for selecting which processing member is to be used, means controlled by said disabling means for activating the selected processing member at the end of a delay period, means controlled by said stepping switch for deactivating the selected processing member, and means operative after a complete processing for operating on said interlocking means to change the processing member selection.

10. In an article processing system having a processing cycle whose total duration is a function of the weight of the article being processed plus any delay periods, said processing changing the weight of said article, two processing members adapted to act on two articles for processing the same, said system being adapted to process only one article at one time while another article is being readied at the same time for processing, an element movable over a range in proportion to the weight of the article being processed, photoelectric means controlled by said element for generating an electrical pulse corresponding to a predetermined proportional weight increment, a stepping switch for receiving said pulses and adapted to move one step for each pulse, means for disabling said stepping switch during a preliminary delay period prior to processing, means for setting said stepping switch to a starting position between successive complete processings, interlocking means for selecting which processing member is to be used, means controlled by said disabling means for activating the selected processing member at the end of a delay period, means controlled by said stepping switch for interrupting the activation of the selected processing member after a predetermined number of switch steps, means controlled by said stepping switch for terminating the activation of the selected processing member after additional switch steps, manual means for disabling the interrupt control means, and means operative after a complete processing for operating on said interlocking means to change the processing member selection.

11. In an article processing system having a processing cycle whose total duration is a function of the weight of the article being processed plus any delay periods prior to processing during which the system puts itself into condition for processing, said processing changing the weight of said article, two processing members adapted to act on two articles for processing the same, said system being adapted to process only one article at one time while another article is being readied at the same time for processing, an element movable over a range in proportion to the weight of said article, a member movable with said element and carrying a series of graduations consisting of alternate transparent and opaque portions, a light source and photo-cell cooperating with said graduated member, a stepping switch, means between said cell and stepping switch for advancing said switch as said graduated member moves with article weight variation, means for disabling said stepping switch during a preliminary period prior to processing, means for setting said stepping switch to a starting position between successive complete processings, interlocking relay means for selecting which processing member is to be used, means controlled by said disabling means for activating the selected processing member at the end of a delay period, means controlled by said stepping switch for deactivating the selected processing member, and means operative after a complete processing for operating on said interlocking means to change the processing member selection.

12. In an article processing system having a processing cycle whose total duration is a function of the weight of the article being processed plus any delay period preliminary to processing, said processing changing the weight of said article, two processing members adapted to act on two articles for processing the same, said system being adapted to process only one article at one time while another article is being readied at the same time for processing, a member movable over a range with article weight variation and carrying a series of graduations consisting of alternate transparent and opaque portions, a light source and photo-cell cooperating with said graduated member, a stepping switch, means between said cell and stepping switch for advancing said switch as said graduated member moves with article weight variation, means for disabling said stepping switch during a preliminary delay period prior to processing, means for setting said stepping switch to a starting position between successive complete processings, interlock relay means for selecting which processing member is to be used, means controlled by said disabling means for activating the selected processing member at the end of a delay period, means controlled by said stepping switch for interrupting the activation of the selected processing member after a predetermined number of switch steps, means controlled by said stepping switch for terminating the activation of the selected processing member after additional switch steps, manual means for disabling the interrupt control means, and means operative after a complete processing for operating on said interlocking means to change the processing member selection.

13. In an article processing system having a processing cycle whose total duration is a function of the weight of the article being processed plus any delay period prior to processing, said processing changing the weight of said article, two processing members adapted to act on two articles for processing the same, said system being adapted to process one article at one time while another article is being readied at the same time for processing, a member movable over a range with article weight variation and carrying a series of graduations consisting of alternate transparent and opaque portions, a light source and photo-cell cooperating with said graduated member, a stepping switch, means between said cell and stepping switch for advancing said switch as said graduated member moves with article weight variation, a starting switch for initiating processing including a preliminary delay period for allowing said member to reach a position of stable equilibrium prior to active processing, relay means controlled by said starting switch for disabling said stepping switch advancing means during said delay period, relay means controlled by said starting switch for setting said stepping switch to a starting position between successive complete processings, interlock relay means for selecting which processing member is to be used, relay means controlled by said disabling means for activating the selected processing member at the end of any delay period, means controlled by said stepping switch for deactivating the selected processing member, and means operative after a complete processing for operating on said interlock relay means to change the processing member selection.

14. The system according to claim 13 wherein means are provided controlled by said stepping switch for interrupting the activation of the selected processing member prior to the termination of processing and manual means for disabling the interrupt means whereby processing may be carried on as a continuous operation on an article or in discrete steps on an article.

WALTER E. MOSS.
ORLANDO GARAPOLO.

REFERENCES CITED

The following references are of record in the file of this patent:

UNITED STATES PATENTS

| Number | Name | Date |
|---|---|---|
| 2,049,283 | Weckerly | July 28, 1936 |
| 2,067,613 | McMaster | Jan. 12, 1937 |
| 2,088,257 | Beisser | July 27, 1937 |
| 2,148,923 | Beisser | Feb. 28, 1939 |
| 2,199,010 | Robb | Apr. 30, 1940 |
| 2,303,010 | Walter | Nov. 24, 1942 |
| 2,346,953 | Walter | Apr. 18, 1944 |